US008843672B2

(12) United States Patent
Oe et al.

(10) Patent No.: US 8,843,672 B2
(45) Date of Patent: Sep. 23, 2014

(54) ACCESS METHOD, COMPUTER AND RECORDING MEDIUM

(75) Inventors: Kazuichi Oe, Kawasaki (JP); Kazutaka Ogihara, Kawasaki (JP); Yasuo Noguchi, Kawasaki (JP); Tatsuo Kumano, Kawasaki (JP); Masahisa Tamura, Kawasaki (JP); Yoshihiro Tsuchiya, Kawasaki (JP); Takashi Watanabe, Kawasaki (JP); Toshihiro Ozawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 137 days.

(21) Appl. No.: 13/418,714

(22) Filed: Mar. 13, 2012

(65) Prior Publication Data

US 2012/0265907 A1 Oct. 18, 2012

(30) Foreign Application Priority Data

Apr. 12, 2011 (JP) ................. 2011-088051

(51) Int. Cl.
*G06F 3/00* (2006.01)
*G06F 11/34* (2006.01)

(52) U.S. Cl.
CPC ........ *G06F 11/3409* (2013.01); *G06F 2201/81* (2013.01); *G06F 11/3485* (2013.01)
USPC .................. 710/36; 710/37; 710/38; 710/39; 710/40; 710/41; 710/42; 710/43; 710/44; 710/45; 710/46; 710/47; 710/48; 710/49; 710/50; 710/51

(58) Field of Classification Search
CPC ............ G06F 11/3485; G06F 11/3409; G06F 2201/81
See application file for complete search history.

(56) References Cited

U.S. PATENT DOCUMENTS 5,067,099 A * 11/1991 McCown et al. ............. 702/183
5,640,597 A *  6/1997 Noguchi et al. ................ 710/21
5,907,683 A *  5/1999 Engelsiepen et al. ......... 709/231

(Continued)

FOREIGN PATENT DOCUMENTS

JP        2001-43032        2/2001

OTHER PUBLICATIONS

"Disk I/O Components", Princeton University, 2011, http://www.princeton.edu/~unix/Solaris/troubleshoot/diskio.html.*

(Continued)

*Primary Examiner* — Henry Tsai
*Assistant Examiner* — Jing-Yih Shyu
(74) *Attorney, Agent, or Firm* — Staas & Halsey LLP

(57) ABSTRACT

An access method includes: obtaining, by a computer, a result of monitoring a busy rate and a number of access operations per unit time of a storage device, the storage device having a first storage area and a second storage area; calculating a characteristic of correlation between the busy rate and the number of access operations per unit time based on the result; calculating a second number of access operations per unit time based on the characteristic of the correlation such that a sum of a first busy rate corresponding to a first number of access operations per unit time and a second busy rate corresponding to a second number of access operations per unit time becomes equal to or lower than a given busy rate; and controlling a number of operations to access the second storage area per unit time based on the second number of access operations.

13 Claims, 9 Drawing Sheets

(56) References Cited

U.S. PATENT DOCUMENTS

| | | | | |
|---|---|---|---|---|
| 6,067,636 | A * | 5/2000 | Yao et al. | 714/15 |
| 6,148,335 | A * | 11/2000 | Haggard et al. | 709/224 |
| 6,405,327 | B1 * | 6/2002 | Sipple et al. | 714/39 |
| 6,480,904 | B1 | 11/2002 | Kato et al. | |
| 6,571,288 | B1 * | 5/2003 | Sarukkai | 709/226 |
| 6,694,405 | B2 * | 2/2004 | Lam et al. | 711/112 |
| 6,785,792 | B2 * | 8/2004 | Katsurashima | 711/165 |
| 6,975,963 | B2 * | 12/2005 | Hamilton et al. | 702/182 |
| 7,000,088 | B1 * | 2/2006 | Rudeseal et al. | 711/173 |
| 7,096,315 | B2 * | 8/2006 | Takeda et al. | 711/111 |
| 7,107,273 | B2 * | 9/2006 | Ohata et al. | 1/1 |
| 7,171,668 | B2 * | 1/2007 | Molloy et al. | 718/105 |
| 7,185,168 | B2 * | 2/2007 | Rudeseal et al. | 711/173 |
| 7,467,263 | B2 * | 12/2008 | Ozaki et al. | 711/154 |
| 7,653,725 | B2 * | 1/2010 | Yahiro et al. | 709/224 |
| 7,930,511 | B2 * | 4/2011 | Hashimoto et al. | 711/173 |
| 8,046,767 | B2 * | 10/2011 | Rolia et al. | 718/104 |
| 8,087,026 | B2 * | 12/2011 | Zhong | 718/104 |
| 8,214,557 | B2 * | 7/2012 | Arena et al. | 710/36 |
| 8,244,934 | B2 * | 8/2012 | Veni et al. | 710/38 |
| 8,346,990 | B2 * | 1/2013 | McKean et al. | 710/15 |
| 8,407,336 | B2 * | 3/2013 | Oe et al. | 709/224 |
| 8,472,326 | B2 * | 6/2013 | Morrill | 370/241 |
| 8,489,737 | B2 * | 7/2013 | Baumback et al. | 709/224 |
| 2003/0046491 | A1 * | 3/2003 | Katsurashima | 711/114 |
| 2003/0093619 | A1 * | 5/2003 | Sugino et al. | 711/114 |
| 2004/0098423 | A1 * | 5/2004 | Chigusa et al. | 707/204 |
| 2006/0010290 | A1 * | 1/2006 | Sasamoto | 711/114 |
| 2006/0265497 | A1 * | 11/2006 | Ohata et al. | 709/224 |
| 2008/0082777 | A1 * | 4/2008 | Sakaguchi et al. | 711/170 |
| 2009/0082777 | A1 * | 3/2009 | Milliman et al. | 606/104 |
| 2009/0089503 | A1 * | 4/2009 | Yoshida et al. | 711/114 |
| 2009/0113156 | A1 * | 4/2009 | Fujita et al. | 711/165 |
| 2009/0157699 | A1 * | 6/2009 | Ohata et al. | 707/10 |
| 2012/0198015 | A1 * | 8/2012 | Gorti et al. | 709/206 |
| 2013/0085611 | A1 * | 4/2013 | Bentivegna et al. | 700/276 |

OTHER PUBLICATIONS

"How to understand measures of disk performance", Silicon Graphics Inc., 2004, http://oss.sgi.com/projects/pcp/pcp-gui.git/man/html/howto.diskperf.html.*

* cited by examiner

FIG. 3

| DEVICE: | rrqm/s | wrqm/s | r/s | w/s | rsec/s | wsec/s | rkB/s | wkB/s | avgrq-sz | avgqu-sz | await | svctm | %util |
|---|---|---|---|---|---|---|---|---|---|---|---|---|---|
| hda | 0.48 | 25.35 | 0.23 | 1.69 | 11.12 | 216.38 | 5.56 | 108.19 | 118.26 | 1.38 | 714.39 | 18.48 | 3.56 |

ACCESS METHOD, COMPUTER AND RECORDING MEDIUM

CROSS-REFERENCE TO RELATED APPLICATION(S)

This application is based upon and claims the benefit of priority of the prior Japanese Patent Application No. 2011-88051, filed on Apr. 12, 2011, the entire contents of which are incorporated herein by reference.

FIELD

The embodiment discussed herein is related to a technology for input and output (IO) control to and from a storage device.

BACKGROUND

Input and output per second (IOPS) or throughput is used as a method for guaranteeing performance of a storage device, etc.

A busy rate of a storage device is an index which indicates how busy the device is. The busy rate is obtained, for example, based on a ratio of a period of time for which an IO request stays in an IO queue. If the busy rate of a storage device is 100 percent (corresponding to "1" if represented as a value not smaller than 0 and not greater than 1), for example, further performance may not be pulled out from the device. If the busy rate of the storage device is 100 percent, IO requests are piled up on the IO queue and IO operations are being carried out, and it may be difficult to enhance IO performance. An IOPS value may be obtained based on the number of accesses (number of IO operations) counted for every block in a unit of time length.

If a storage device is accessed, the busy rate of the storage device may change based on changes of a disk location and a disk area where an IO operation occurs, a ratio between the numbers of read and write instructions, or how IO sizes are distributed, even if the IOPS value does not substantially change. A time length for an overhead operation in case of IO operations occurring in an entire storage area except for data transfer, for example, a length of seek time is longer than a time length for an overhead operation in case of IO operations occurring in part of the storage area except for data transfer, for example, a length of seek time. The busy rate may thereby be higher in the former case than in the latter case even if the IOPS value does not change.

Japanese Laid-open Patent Publication No. 2001-43032 discusses a related art.

SUMMARY

According to an aspect of the invention, an access method includes: obtaining, by a computer, a result of monitoring a busy rate and a number of access operations per unit time of a storage device, the storage device having a first storage area and a second storage area; calculating a characteristic of correlation between the busy rate and the number of access operations per unit time based on the result; calculating a second number of access operations per unit time based on the characteristic of the correlation such that a sum of a first busy rate corresponding to a first number of access operations per unit time and a second busy rate corresponding to a second number of access operations per unit time becomes equal to or lower than a given busy rate; and controlling a number of operations to access the second storage area per unit time based on the second number of access operations.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 depicts exemplary data.

DESCRIPTION OF EMBODIMENT

Suppose that a plurality of terminal PCs has first and second areas into which a storage area of one storage device is divided in common. Suppose that, in order to obtain a certain IOPS value with which one terminal PC accesses the first area, an IOPS value with which the other the terminal PC accesses the second area is controlled so as to become a certain value or less. In that case, the busy rate may be saturated depending upon how the first and second areas are accessed. The certain IOPS value may not be obtained with regard to access to the first area by means of simple control based on IOPS.

Figure 1:
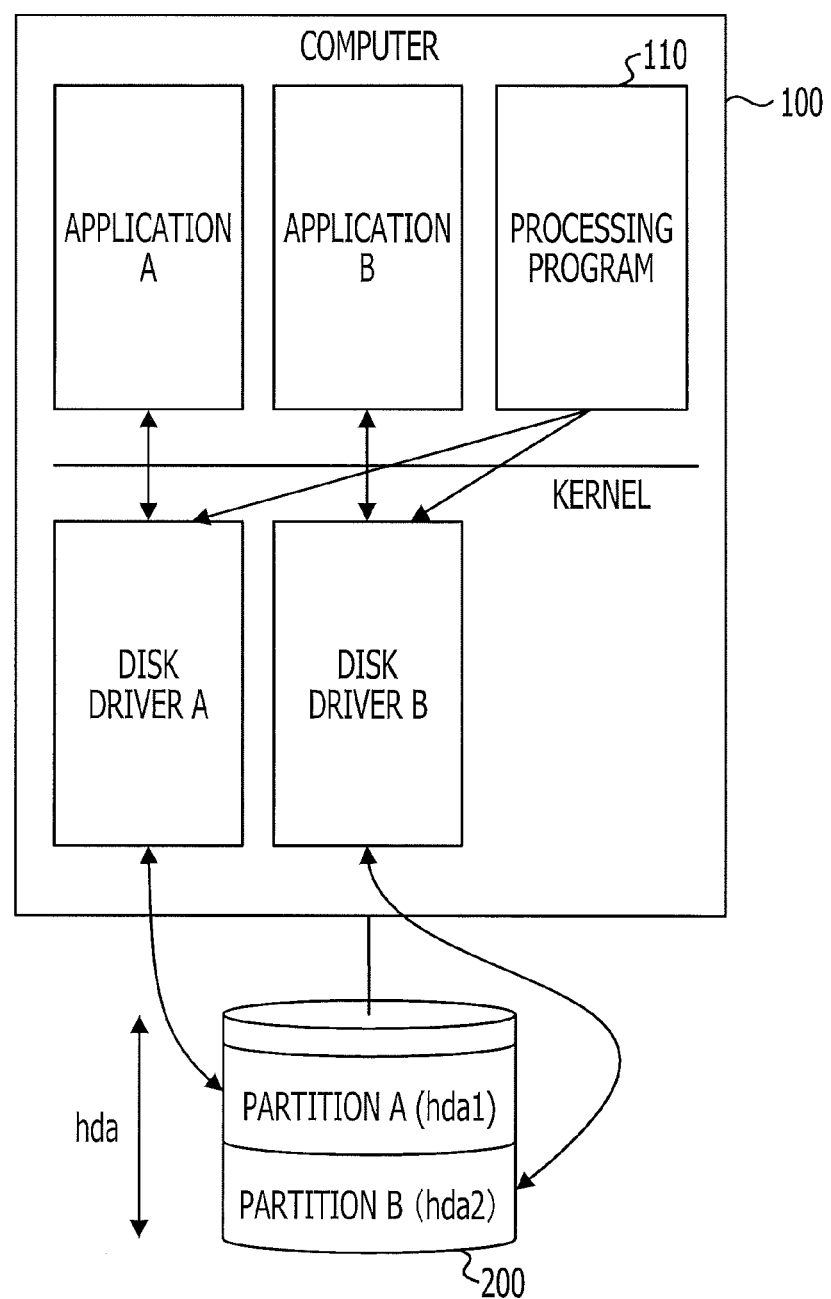
FIG. 1 depicts an exemplary computer.

FIG. 1 illustrates an exemplary computer. A computer 100 illustrated in FIG. 1 is coupled to a storage device 200 corresponding to, for example, a hard disk hda. The computer 100 has a kernel including a disk driver A for a partition A (named hda1) in the storage device 200 and a disk driver B for a partition B (named hda2) in the storage device 200. The computer 100 executes applications A and B. The application A accesses the partition A in the storage device 200 through the disk driver A. The application B accesses the partition B in the storage device 200 through the disk driver B.

The computer 100 may execute a processing program 110 for performing a process for bandwidth control, for example, a daemon.

The processing program 110 decides bandwidth control for guaranteeing IO performance based on the busy rate and the IOPS of the storage device 200 according to present IO condition, and instructs the disk drivers in the decision. The JO performance may be guaranteed for the application A for convenience of explanation.

Figure 2:
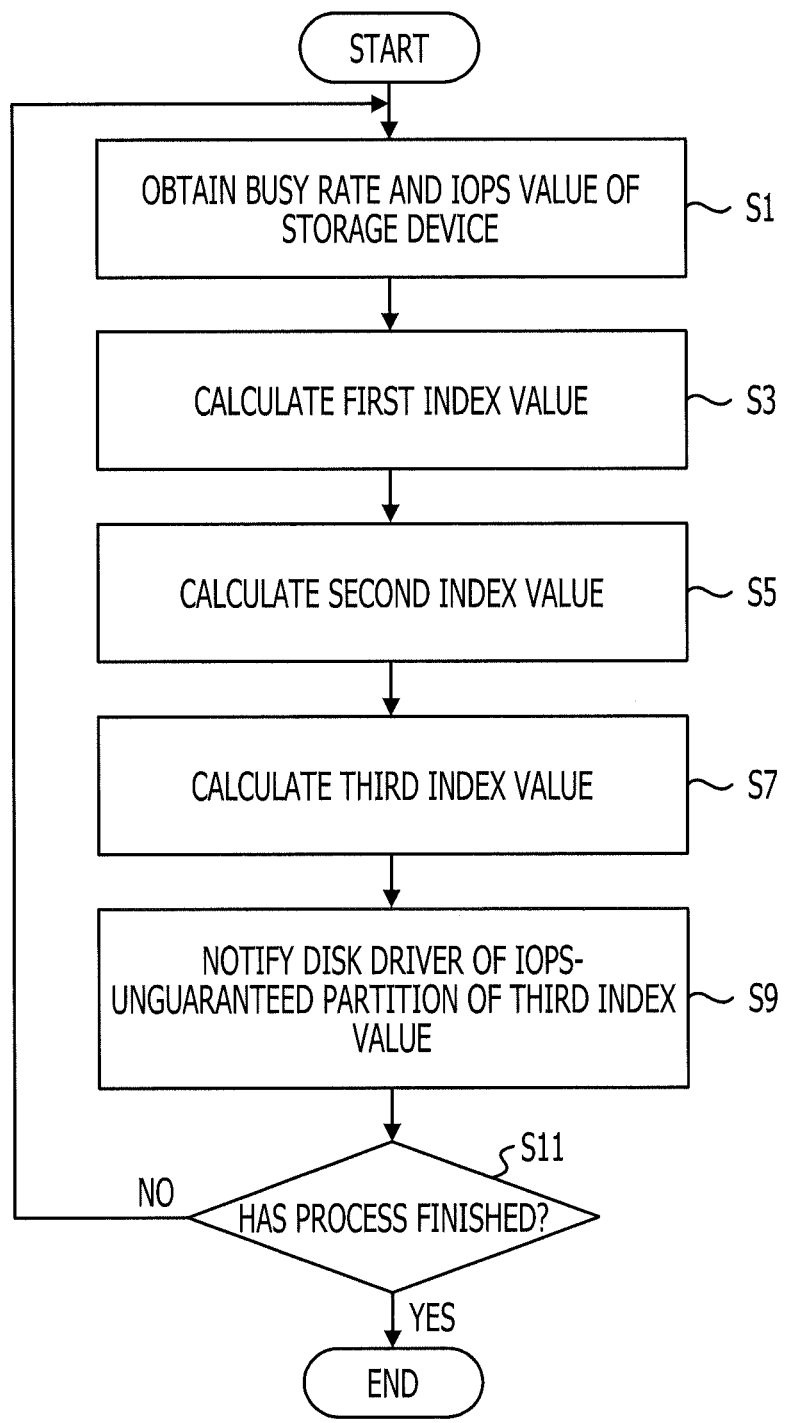
FIG. 2 depicts an exemplary program process.
Figure 4:
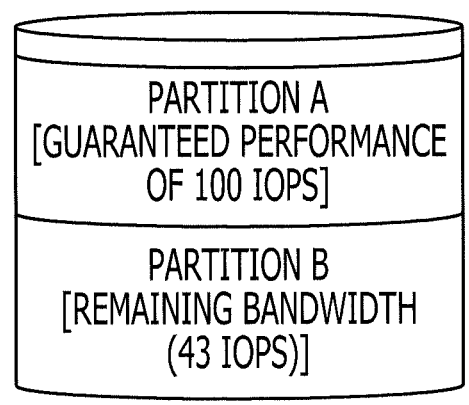
FIG. 4 depicts exemplary condition in bandwidth control.

FIG. 2 illustrates an exemplary program process. FIG. 3 illustrates exemplary data. FIG. 4 illustrates an exemplary condition in a bandwidth control. The processing program 110 illustrated in FIG. 1 may correspond to a processing program illustrated in FIG. 2. The processing program 110, for example, obtains the busy rate and the IOPS value of the storage device 200 from the kernel periodically, for example, every one minute in an operation S1.

In a Linux, for example, the processing program 110 may output an "iostat-x" command to the kernel so as to obtain, for example, the data illustrated in FIG. 3.

A sum of values of r/s and w/s illustrated in FIG. 3 indicates the IOPS. A value of % util indicates the busy rate.

The processing program 110 calculates a first index value based on the busy rate and IOPS value in an operation S3. The first index value indicates a busy rate to be consumed to obtain one IOPS. It may be supposed for the first index value that the busy rate at a processing timing is linearly related to the IOPS value. A correlation characteristic such as a function f (busy rate, IOPS value) may be used.

The processing program 110 calculates a second index value based on the first index value times a guaranteed TOPS value in an operation S5. The application A or a user of the application A may provide the processing program 110 with the guaranteed IOPS value. The second index value indicates a busy rate to be consumed to obtain the guaranteed IOPS value.

The guaranteed IOPS value may be too large. If, for example, the busy rate is indicated in percent, the second index value may be more than 100. If the busy rate is indicated as a value in the range of 0 to 1, the second index value may be more than one. A threshold may be preset in order that another applications use the storage device 200. If the second index value is more than the threshold, no process may be done as the IOPS is not guaranteed, or reduction of the guaranteed IOPS value may be requested. The IOPS value may be reduced to a range in which the guaranteed IOPS value is automatically guaranteed.

If, for example, the first index value is 0.7 [percent/IOPS] and the guaranteed IOPS value is 100, the busy rate may be 0.7×100=70 percent so that the guaranteed IOPS value is obtained. If, for example, the IOPS value is guaranteed based on an request from the application A, a busy rate of 70 percent may be secured.

The processing program 110 calculates a third index value according to (100-second index value)/(first index value) as an operation S7. If the busy rate is treated in percent, use (100-second index value)/(first index value). If the busy rate is treated as a value in the range of 0 to 1, use (1-second index value)/(first index value). Divide a difference between an upper limit value of the busy rate and the second index value by the first index value so as to calculate the third index value. An IOPS limit value for access to the partition B by the application B for which the IOPS value is not guaranteed is obtained based on the calculation. Calculate, for example, (100−70)/0.7=43 IOPS which may be the IOPS limit value.

Performance of 100 IOPS is guaranteed for the partition A that the application A accesses, and the partition B that the application B accesses may be set to the remaining bandwidth up to 43 IOPS, as depicted in FIG. 4.

The processing program 110 notifies a disk driver of an IOPS-unguaranteed partition of the third index value so as to limit the bandwidth to the third index value or below in an operation S9. The disk driver of the IOPS-unguaranteed partition may be, for example, the disk driver B. The processing program 110 may notify the disk driver B of 43 IOPS.

The above process may be repeated, for example, until the process or bandwidth guarantee finishes in an operation S11. The above process may be repeated, for example, in fixed cycles. The above process may not repeated in fixed cycles. As the guarantee may become difficult if the busy rate rises, for example, the cycle time may be set short. The above process may be carried out at any time.

The guarantee of IO performance taking the busy rate according to present condition for IO occurrences into account is performed.

Figure 5:
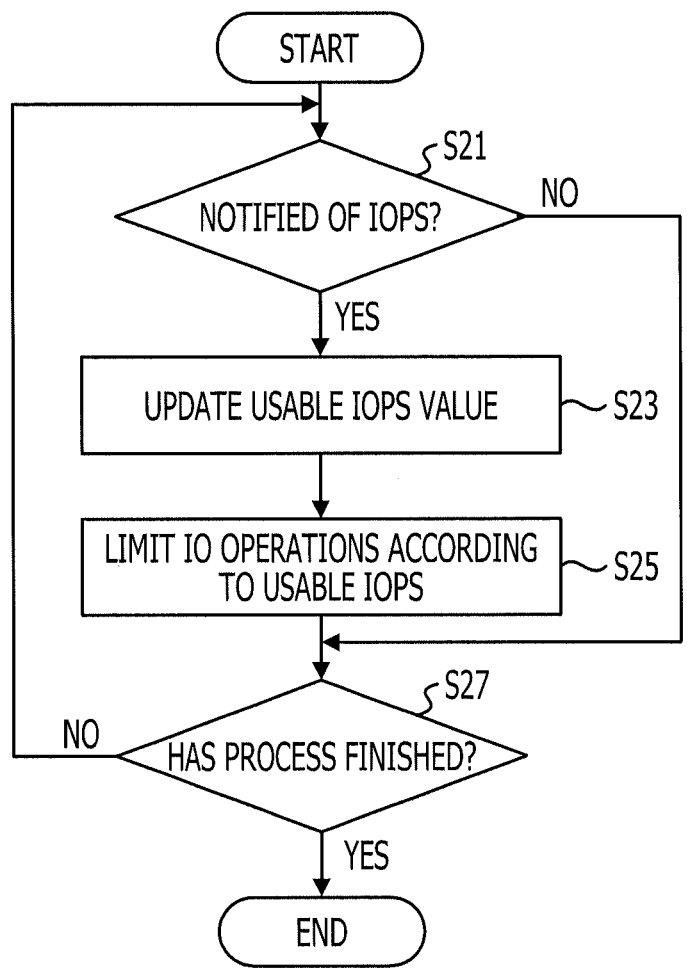
FIG. 5 depicts an exemplary process run by a disk driver.

FIG. 5 depicts an exemplary process of the disk driver. The disk driver depicted in FIG. 1 may execute the process depicted in FIG. 5. The disk driver decides whether the disk driver has been notified of the IOPS by the processing program 110 in an operation S21. If the IOPS is not notified, the disk driver maintains present condition and proceeds to the process to an operation S27. When receiving the IOPS from the processing program 110, the disk driver updates an IOPS value that the disk driver uses based on the notified TOPS in an operation S23. The disk driver B may be notified of 43 IOPS. The TOPS value that the disk driver B can use is updated to 43 IOPS.

The disk driver limits the IO operations based on the usable IOPS value as an operation S25. The disk driver may limit a maximum IOPS value to 43, for example, by blocking an IO operation after processing 43 IO operations every second. The IOPS is controlled to limit to become the limit value or below. The above process may be repeated in the operation S27 until the process finishes.

As IO operations are limited in the IOPS-unguaranteed partitions and are limitlessly processed in the IOPS-guaranteed partitions, a specified guaranteed TOPS value may be obtained.

The storage device 200 has, for example, two partitions. The application A for which the IOPS is guaranteed accesses the partition A. The application B for which the IOPS is not guaranteed accesses the partition B. Bandwidths for plural applications may be guaranteed.

Figure 6:
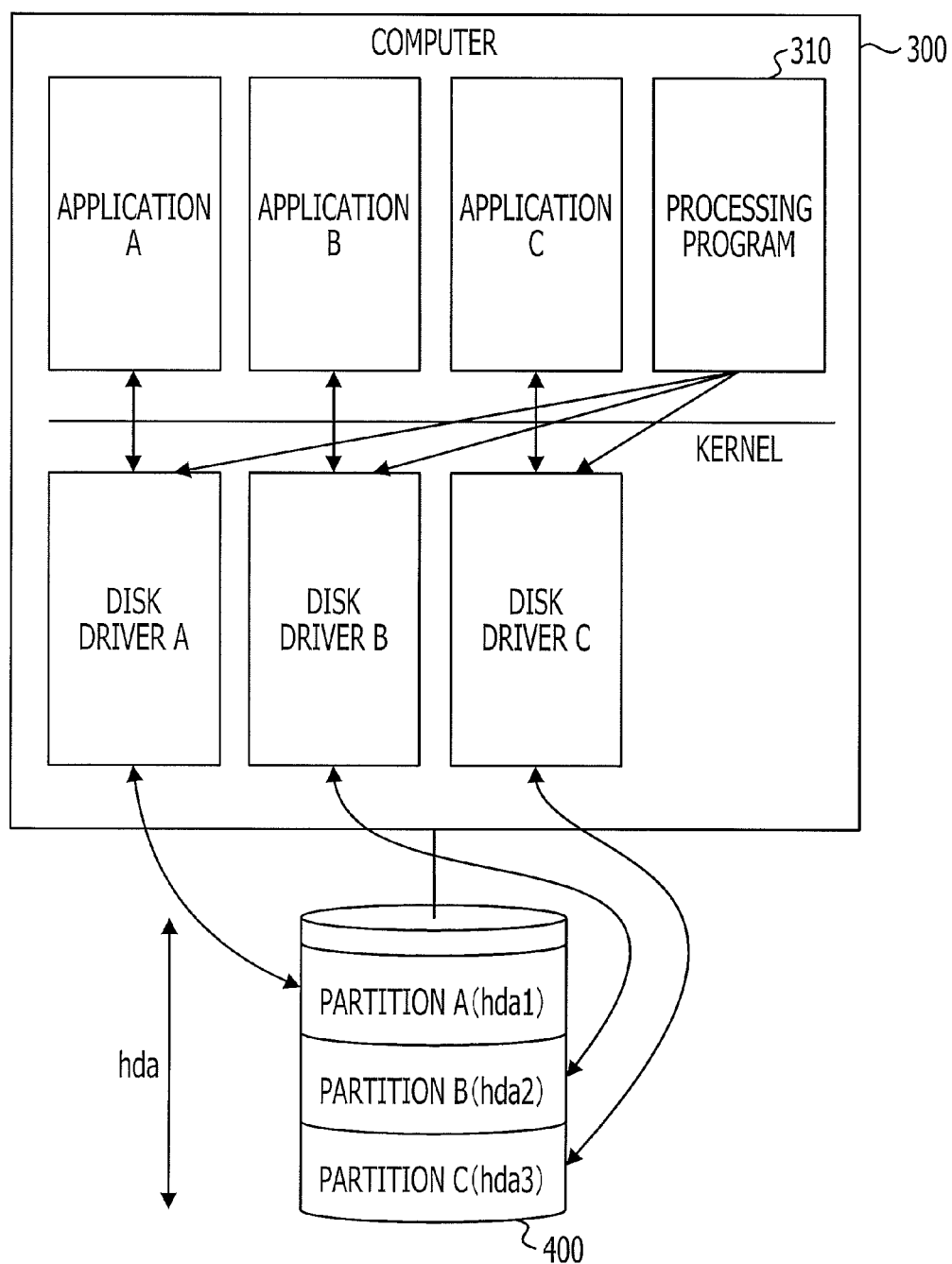
FIG. 6 depicts an exemplary computer.

FIG. 6 depicts an exemplary computer. FIG. 6 depicts a computer 300 coupled to a storage device 400, for example, a hard disk hda. The computer 300 has a kernel including a disk driver A for a partition A (named hda1) in the storage device 400, a disk driver B for a partition B (named hda2) in the storage device 400, and a disk driver C for a partition C (named hda3) in the storage device 400. The computer 300 executes applications A through C. The application A accesses the partition A in the storage device 400 through the disk driver A. The application B accesses the partition B in the storage device 400 through the disk driver B. The application C accesses the partition C in the storage device 400 through the disk driver C.

The computer 300 executes a processing program 310 for bandwidth control, for example, a daemon.

The processing program 310 decides bandwidth control for guaranteeing IO performance based on the busy rate and the IOPS of the storage device 400 according to present access condition, and instructs the disk drivers. The IO performance may be guaranteed for the applications A and B.

Figure 7:
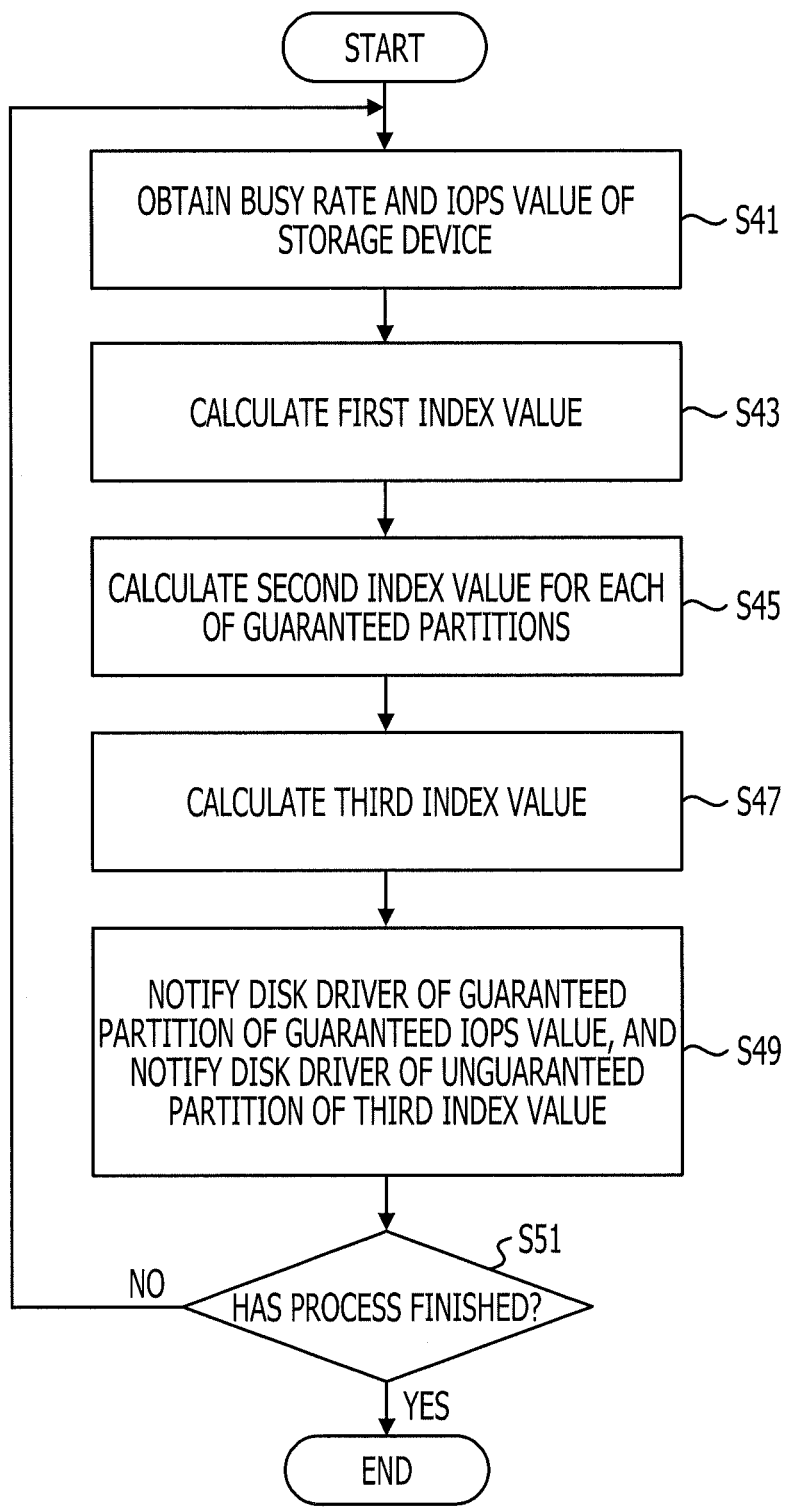
FIG. 7 depicts an exemplary program process.
Figure 8:
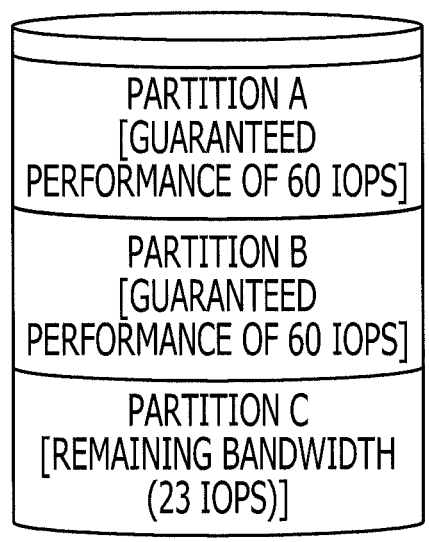
FIG. 8 depicts exemplary condition in bandwidth control.

FIG. 7 depicts an exemplary processing program. FIG. 8 depicts exemplary condition in the bandwidth control. The processing program depicted in FIG. 7 may correspond to a process according to the processing program 310 depicted in FIG. 6. The processing program 310 obtains the busy rate and the IOPS value of the storage device 400 from the kernel periodically, for example, every one minute in an operation S41. The operation S41 depicted in FIG. 7 may correspond to the operation S1 depicted in FIG. 2.

The processing program 310 calculates a first index value based on the busy rate and IOPS value in an operation S43. The first index value indicates a busy rate to be consumed when obtaining one IOPS. The operation S43 depicted in FIG. 7 may correspond to the operation S3 depicted in FIG. 2.

The processing program 310 calculates a second index value for a partition that each of the applications for which the bandwidth is guaranteed accesses based on the first index value times the guaranteed IOPS value in an operation S45. The applications A and B or a user of the applications A and B may set the guaranteed IOPS value. The second index value indicates a busy rate to be consumed when obtaining the guaranteed IOPS value. If the guaranteed IOPS value is too large, a process which is substantially the same as or similar to the above process may be carried out.

The first index value may be, for example, 0.7 [percent/IOPS]. The IOPS value for the application A may be 60. The IOPS value for the application B may be 60. The busy rate may be 0.7 ×60=42 percent so that the guaranteed IOPS value is obtained. The busy rate of 42 percent may be secured if the IOPS value is guaranteed as requested by the application A, and so may be if requested by the application B.

The processing program 310 calculates a third index value according to (100-sum of second index values)/(first index value) in an operation S47. If the busy rate is treated in percent, a calculation (100-sum of second index values)/(first index value) may be used. If the busy rate is treated as a value in a range 0 to 1, a calculation (1-sum of second index values)/(first index value) may be used. Divide a difference between an upper limit value of the busy rate and the sum of the second index values by the first index value so as to calculate the third index value. According to the calculation, an IOPS limit value is obtained with regard to access to the partition C made by the application C for which the IOPS value is not guaranteed. Calculate, for example, (100−84)/0.7=23 TOPS which may be the IOPS limit value.

Performance of 60 IOPS is guaranteed for the partition A that the application A accesses as depicted in FIG. 8. Performance of 60 IOPS is guaranteed for the partition B that the application B accesses. The IOPS value for the partition C that the application C accesses may be set up to 23 IOPS which corresponds to the remaining bandwidth.

The processing program 310 notifies a disk driver of an IOPS-guaranteed partition of the guaranteed IOPS value so as to control the guaranteed IOPS value or below, and notifies a disk driver of an IOPS-unguaranteed partition of the third index value so as to limit the bandwidth to the third index value or below as an operation S49. The disk drivers A and B of the IOPS-guaranteed partitions are each notified of 60 IOPS, and the disk driver C of the IOPS-unguaranteed partition is notified of 23 IOPS.

The above process may be repeated, for example, until the process or bandwidth guarantee finishes in an operation S51. The above process may be repeated, for example, in fixed cycles. The above process may not be repeated in fixed cycles. If the busy rate falls, for example, the cycle time may be set long. The above process may be carried out at any time.

The processing program 310 may notify only the disk driver of the IOPS-unguaranteed partition. If there are plural applications which access the IOPS-guaranteed partitions, the processing program 310 may notify each of the partitions of a maximum TOPS value. The guarantee of IO performance may be carried out based on the busy rate according to present condition for IO occurrences.

The process performed by each of the disk drivers may be substantially same as or similar to the process depicted in FIG. 5.

If one IOPS-guaranteed partition and plural IOPS-unguaranteed partitions exist, the processing program 310 notifies a disk driver of each of the partitions. The IOPS values notified to the plural IOPS-unguaranteed partitions may be, for example, equivalent to one another, ranked in priority order or distributed at an angle.

If, for example, the disk driver identifies an application or plural applications use a partition in common, a limited IOPS value of an IOPS-unguaranteed application may be calculated so that the bandwidth is guaranteed.

If plural storage devices exist, the process may be executed for every one of the storage devices.

Figure 9:
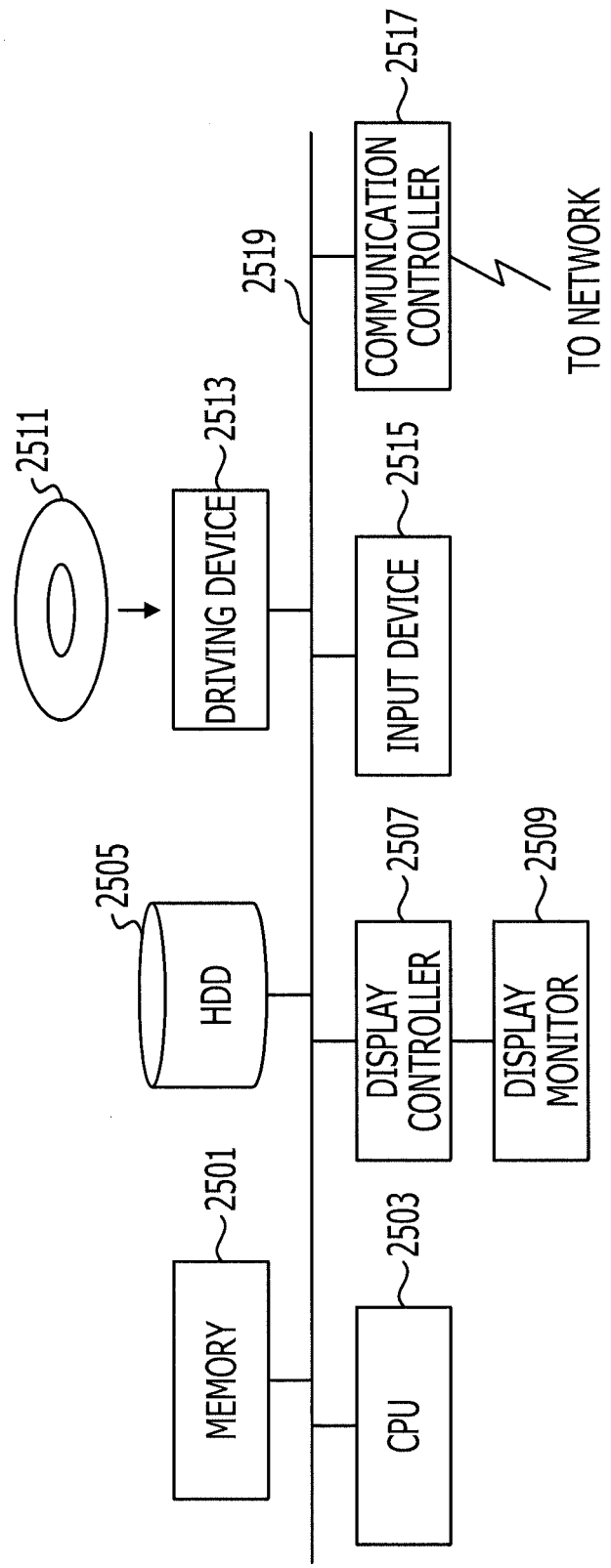
FIG. 9 depicts an exemplary computer device.

FIG. 9 depicts an exemplary computer device. The computers 100 and 300 depicted in FIGS. 1 and 6, respectively, may the computer device depicted in FIG. 9. As depicted in FIG. 9, a memory 2501, a central processing unit (CPU) 2503, a hard disk drive (HDD) 2505, a display controller 2507 coupled to a display monitor 2509, a driving device 2513 for a removable disk 2511, an input device 2515, and a communication controller 2517 for coupling the computer device to a network are coupled to one another through a bus 2519. An operating system (OS) and an application program for carrying out the above process may be stored, for example, in the HDD 2505. The CPU 2503 may execute a program, for example, read from the HDD 2505 to the memory 2501. The CPU 2503 controls the display controller 2507, the communication controller 2517 or the driving device 2513 in accordance with the process of the application program. Data being processed in progress may be stored in the memory 2501 or in the HDD 2505. The application program for carrying out the above process may be stored in the computer-readable removable disk 2511 and distributed. The application program is installed from the driving device 2513 into the HDD 2505. The application program may be installed into the HDD 2505 through a network such as the Internet and the communication controller 2517. Hardware components such as the CPU 2503 or the memory 2501 may organically collaborate with the programs such as the OS or the application program in the computer device.

A program for making a computer carry out the above process may be generated. The program may be stored, for example, in a computer-readable storage media or storage device such as a flexible disk, a CD-ROM, a magneto-optical disk, a semiconductor memory or a hard disk. An intermediate result of data process may be temporarily stored in the memory device such as the main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An access method comprising:
    obtaining, by a computer, a result of monitoring a busy rate and a number of access operations per unit time of a storage device, the storage device having a first storage area and a second storage area;
    acquiring a characteristic of correlation between the busy rate and the number of access operations per unit time based on the result;
    calculating a first value, using the characteristic of correlation, based on the busy rate and the number of access operations per unit time;
    calculating a first busy rate corresponding to a first number of access operations per unit time for the first storage area based on the first value and a guaranteed number of access operations per unit time which is guaranteed for the first storage area;
    calculating a second number of access operations per unit time based on the first busy rate and the first value; and controlling a number of operations to access the second storage area based on the second number of access operations per unit time.

2. The access method according to claim 1, further comprising,
notifying a controller to control the second storage area with the second number of access operations per unit time.

3. The access method according to claim 1, further comprising:
dividing the busy rate by the number of access operations per unit time to calculate the first value;
calculating the first busy rate by multiplying the first value by the guaranteed number of access operations per unit time for the first storage area; and
calculating the second number of access operations per unit time by dividing a difference between a maximum value of the busy rate and the first busy rate by the first value.

4. The access method according to claim 1, wherein the number of access operations per unit time, the first number of access operations per unit time and the second number of access operations per unit time each correspond to an Input Output Per Second value.

5. The access method according to claim 1, further comprising,
controlling a number of operations to access one of a plurality of storage areas included in the first storage area so as to become equal to or below a number of access operations to the one of the plurality of storage areas by an application.

6. A computer comprising:
a storage device including a first storage area and a second storage area;
a controller to control a number of operations to access the second storage area per unit time so as to become equal to or below a given number of access operations; and
a processor to execute operations including:
obtaining a result of monitoring a busy rate and a number of access operations per unit time of the storage device;
acquiring a characteristic of correlation between the busy rate and the number of access operations per unit time based on the result;
calculating a first value, using the characteristic of correlation, based on the busy rate and the number of access operations per unit time;
calculating a first busy rate corresponding to a first number of access operations per unit time for the first storage area based on the first value and a guaranteed number of access operations per unit time which is guaranteed for the first storage area;
calculating a second number of access operations per unit time based on the first busy rate and the first value; and
controlling a number of operations to access the second storage area based on the second number of access operations per unit time.

7. The computer according to claim 6, wherein the operations further includes:
dividing the busy rate by the number of access operations per unit time to calculate the first value;
calculating the first busy rate by multiplying the first value by the guaranteed number of access operations per unit time for the first storage area; and
calculating the second number of access operations per unit time by dividing a difference between a maximum value of the busy rate and the first busy rate by the first value.

8. The computer according to claim 6, wherein the number of access operations per unit time, the first number of access operations per unit time and the second number of access operations per unit time each correspond to an Input Output Per Second value.

9. The computer according to claim 6, wherein the operations further includes:
controlling a number of operations to access one of a plurality of storage areas included in the first storage area so as to become equal to or below a number of access operations to the one of the plurality of storage areas by an application.

10. A non-transitory computer-readable recording medium storing a program to be executed by a computer, the program comprising a set of codes for causing the computer to execute operations of:
obtaining a result of monitoring a busy rate and a number of access operations per unit time of a storage device, the storage device having a first storage area and a second storage area;
acquiring a characteristic of correlation between the busy rate and the number of access operations per unit time based on the result;
calculating a first value, using the characteristic of correlation, based on the busy rate and the number of access operations per unit time;
calculating a first busy rate corresponding to a first number of access operations per unit time for the first storage area based on the first value and a guaranteed number of access operations per unit time which is guaranteed for the first storage area;
calculating a second number of access operations per unit time based on the first busy rate and the first value; and
controlling a number of operations to access the second storage area based on the second number of access operations per unit time.

11. The non-transitory computer-readable recording medium according to claim 10, wherein the operations further includes:
dividing the busy rate by the number of access operations per unit time to calculate the first value;
calculating the first busy rate by multiplying the first value by the guaranteed number of access operations per unit time for the first storage area; and
calculating the second number of access operations per unit time by dividing a difference between a maximum value of the busy rate and the first busy rate by the first value.

12. The non-transitory computer-readable recording medium according to claim 10, wherein the number of access operations per unit time, the first number of access operations per unit time and the second number of access operations per unit time each correspond to an Input Output Per Second value.

13. The non-transitory computer-readable recording medium according to claim 10, wherein the operations further includes: controlling a number of operations to access one of a plurality of storage areas included in the first storage area so as to become equal to or below a number of access operations to the one of the plurality of storage areas by an application.

* * * * *